United States Patent [19]

Iwamoto et al.

[11] Patent Number: 5,071,800
[45] Date of Patent: Dec. 10, 1991

[54] OXIDE POWDER, SINTERED BODY, PROCESS FOR PREPARATION THEREOF AND TARGE COMPOSED THEREOF

[75] Inventors: Tetsushi Iwamoto, Yamagata; Nobuhiro Ogawa, Shinnanyo, both of Japan

[73] Assignee: Tosoh Corporation, Shinnanyo, Japan

[21] Appl. No.: 485,877

[22] Filed: Feb. 27, 1990

[30] Foreign Application Priority Data

| Feb. 28, 1989 | [JP] | Japan | 1-45455 |
| Feb. 28, 1989 | [JP] | Japan | 1-45456 |
| Feb. 28, 1989 | [JP] | Japan | 1-45457 |
| Feb. 28, 1989 | [JP] | Japan | 1-45458 |

[51] Int. Cl.$^5$ .............................................. C04B 35/50
[52] U.S. Cl. ............................ 501/126; 204/192.29; 204/298.13; 423/624
[58] Field of Search ............. 204/192.29, 298.13; 423/624; 501/126; 106/287.19

[56] References Cited

U.S. PATENT DOCUMENTS 4,647,548  3/1987  Klein ........................................ 501/34
4,690,745  9/1987  Klein ................................... 204/192.29

FOREIGN PATENT DOCUMENTS 63-199862  8/1988  Japan .

Primary Examiner—William R. Dixon, Jr.
Assistant Examiner—Chris Gallo
Attorney, Agent, or Firm—Finnegan, Henderson, Farabow, Garrett & Dunner

[57] ABSTRACT

An indium oxide powder or indium oxide/tin oxide powder having an average primary particle diameter of 1 to 0.01 μm, a BET surface area of 15 to 50 m$^2$/g, and a specific surface area of 2 to 5 m$^2$/g as determined from the particle diameter distribution. The mixed powder is prepared by coprecipitating an indium- and tin-containing salt from a solution containing indium and tin, calcining the salt, and pulverizing the calcined product using a specific vibrating pulverizer. A sintered body, prepared by sintering the indium oxide/tin oxide powder, has a density of at least 5.3 g/cm$^3$, a specific resistance of $2 \times 10^{-3}$ to $2 \times 10^{-4}$ Ω-cm, and an average grain diameter of 5 to 15 μm.

25 Claims, 11 Drawing Figures

OXIDE POWDER, SINTERED BODY, PROCESS FOR PREPARATION THEREOF AND TARGE COMPOSED THEREOF

BACKGROUND OF THE INVENTION

1. Field of the Invention

The present invention relates to an indium oxide powder or indium oxide/tin oxide (hereinafter referred to as "ITO") powder, a sintered body, a process for the preparation thereof, and a use thereof. The ITO sintered body of the present invention is useful as a sputtering target for the formation of a transparent electroconductive film by the sputtering method.

2. Description of Related Art

The demand for an ITO film as a transparent electroconductive film for use in a transparent electrode or touch panel of a solar cell or liquid crystal display has recently been increasing. A method comprising coating finely divided ITO particles on a substrate, a method comprising coating an ITO precursor on a substrate and thermally decomposing the precursor, and a method comprising forming an ITO film on the surface of a substrate by sputtering using an ITO alloy target or ITO sintered body target are known as methods for forming such an ITO film, but at the present, the sputtering method using an ITO sintered body target is the most popular.

The ITO sintered body has heretofore been prepared by compression-molding a mixture of an indium oxide powder and a tin oxide powder and sintering the body. Nevertheless, since the indium oxide powder and tin oxide powder are inherently difficult to sinter, it is not easy to prepare an ITO sintered body having a high density by sintering these powders. The sintered density of the ITO sintered body differs to some extent according to the tin content, and the sintered density corresponding to 100% of the theoretical density is about 7.1 $g/cm^3$.

In most conventional ITO sintered bodies, many voids are left in the sintered structure and the sintered density is about 60% of the theoretical density the highest, i.e., up to about 4.3 $g/cm^3$, the specific resistance is larger than $2 \times 10^{-3}$ $\Omega$-cm, and the hue is yellowish green. Since conventional sintered bodies have a low electroconductivity, a low thermal conductivity, and a low mechanical strength, the applicable electric power at the step of forming a film by sputtering is low and therefore, the film-forming rate is low and the discharge state becomes unstable. If excessive electric power is applied so as to increase the film-forming rate, cracking occurs in the sintered body.

Furthermore, when sputtering is carried out by using such a sintered body having a low density, a reduced substance (black substance) is formed on the surface of the sintered body, and if this substance is mingled in a transparent electroconductive film formed on the surface of the substrate, the quality of the film is degraded. Accordingly, every time the reduced substance is formed on the surface of the sintered body, the sputtering operation must be stopped to remove the reduced substance, and this impedes the continuous operation of sputtering.

A conventional sintered body formed by heat pressing a product prepared by a hot press has a relatively high density, but the sintered grain diameter of this ITO sintered body is smaller than 5 $\mu$m and it sometimes happens that the sintered body is partially in the reduced state.

If the sintered grain diameter of the sintered body is smaller than 5 $\mu$m, the flexural strength of the sintered body is low and the mechanical strength is naturally reduced. Moreover, the presence of the reduced substance deteriorates on the quality of the obtained film, as mentioned above.

With a view to solving these problem, investigations have been made to increase the density and reduce the specific resistance in ITO sintered bodies.

For example, there has been proposed a method in which an indium oxide/tin oxide powder having a relatively large particle diameter, that is, an average particle diameter of 3 to 6 $\mu$m, which has been once calcined at a high temperature, is used as the starting material (Japanese Unexamined Patent Publication No. 62-21751). Nevertheless, as seen from the description of examples in this patent publication, the density of the ITO sintered body obtained by using starting material having a relatively large particle diameter is 5 $g/cm^3$ at highest. There has also been proposed a method in which a co-precipitated ITO powder obtained from a solution containing indium and tin by using a precipitating agent is used as the starting material for obtaining a sintered body (Japanese Unexamined Patent Publication No. 62-12009). Nevertheless, the sintered density of the sintered body obtained according to this method is still about 5 $g/cm^3$, i.e., about 70% of the theoretical density.

Furthermore, there has been proposed a method in which oxygen deficiency is introduced into an ITO sintered body to reduce the specific resistance (Japanese Unexamined Patent Publication No. 63-40756). This method is effective for reducing the specific resistance of the sintered body, but it is difficult to obtain a sintered body having a high density.

A method for forming an ITO sintered body having a high density by compression-sintering (hot-pressing) an ITO powder has been proposed. The apparatus used for carrying out this method is expensive and the operation is complicated. Moreover, although it is said that a sintered body having a relatively high density can be obtained according to this method, the method is industrially not advantageous.

As the method for preparing the oxide powder, that is, the indium oxide powder, tin oxide powder or ITO powder, there are known a method in which a powder of a corresponding metal hydroxide, oxide hydrate, organic metal salt or inorganic metal salt, or a sol or gel thereof is heat-dehydrated or thermally decomposed, and a method in which a precipitation product formed by adding a precipitating agent to an aqueous solution of a mixture of an indium salt and a tin salt or a hydrolysis product formed from this aqueous solution is thermally decomposed (Japanese Unexamined Patent Publication No. 62-7627, Japanese Unexamined Patent Publication No. 60-186416 and Japanese Unexamined Patent Publication No. 58-36925). An ITO powder having a high purity can be obtained by the method previously proposed by the present inventors, in which a mixed organic acid salt prepared from an aqueous solution of mixed organic acids containing indium and tin is thermally decomposed (Japanese Unexamined Patent Publication No. 63-195101).

As is apparent from the foregoing description, an ITO sintered body having a high density and a low specific resistance has not been prepared according to an industrial method.

SUMMARY OF THE INVENTION

The primary object of the present invention is to provide an ITO sintered body having a density of at least 5.3 g/cm$^3$, especially at least 6 g/cm$^3$, a specific resistance lower than $2\times10^{-3}$ $\Omega$-cm and an average sintered grain diameter of at least 5 $\mu$m; a process for the preparation of this sintered body; an indium oxide powder or ITO powder from which such a sintered body can be prepared; a process for the preparation of this powder; and a sputtering target in which the characteristics of the ITO sintered body are utilized.

An indium oxide powder or indium oxide/tin oxide powder having an average primary particle diameter in the range of from 1 $\mu$m to 0.01 $\mu$m, a surface area (hereinafter referred to as "BET specific surface area") in the range of from 15 m$^2$/g to 50 m$^2$/g as measured by the BET method, and a specific surface area in the range of from 2 m$^2$/g to 5 m$^2$/g as determined from the particle diameter distribution is a novel powder, and it was found that, when this powder is sintered, a novel sintered body having a high density due to an extreme contraction of the volume by reduction of pores in the interior of the sintered body during the sintering reaction, and having a low specific resistance, is obtained.

It also was found that this powder can be obtained by highly dispersing an indium oxide powder or indium oxide/tin oxide powder having an average primary particle diameter not larger than 1 $\mu$m by using a vibrating pulverizer that satisfies the requirement that the ratio of the diameter of the pulverizing vessel to the vibrating amplitude is lower than 10.

It also was found that the above-mentioned high-density ITO sintered body is useful as a sputtering target and if this sintered body is used as a sputtering target, a highly uniform transparent electroconductive film having a low specific resistance can be formed.

DESCRIPTION OF THE PREFERRED EMBODIMENTS

The indium oxide/tin oxide (ITO) powder used as the starting material for the production of a sintered body in the present invention is not particularly critical, as long as the conditions specified in the present invention are satisfied. Namely, a mere mixture of an indium oxide powder and a tin oxide powder or a powder of a coprecipitated oxide of indium and tin, obtained by calcining a product obtained from a solution containing indium and tin by the coprecipitation method at a temperature of 300° C. to 800° C., can be used.

A method for preparing an indium oxide powder or tin oxide powder, can be a method in which a powder of a corresponding metal hydroxide, organic metal salt or inorganic metal salt, or a sol or gel thereof is heat-dehydrated or thermally decomposed at a temperature of from 300° C. to 800° C., and as a method for preparing a coprecipitated powder of ITO, there is a method in which a precipitating agent is incorporated into a solution of a mixture of an indium salt and a tin salt (Japanese Unexamined Patent Publication No. 60-186416 and Japanese Unexamined Patent Publication No. 62-7627) and a method in which a solution of a mixture of an indium salt and a tin salt is hydrolyzed (Japanese Unexamined Patent Publication No. 63-19510). Furthermore, the method previously proposed by the present inventors, in which a high-purity organic acid salt obtained from an aqueous solution of an organic acid containing indium and/or tin is thermally decomposed (Japanese Unexamined Patent Publication No. 63-195101), is a method for obtaining an excellent powder. The method for preparing a coprecipitated powder of ITO is preferable because the powder has a uniform composition and a sputtering target composed of a sintered body thereof can provide a uniform film.

The average primary particle diameter of the powder in the present invention is in the range of from 1 $\mu$m to 0.01 $\mu$m, preferably in the range of from 0.5 $\mu$m to 0.03 $\mu$m. A powder having a large primary particle diameter has a high dispersibility but a poor sintering property. On the other hand, if the primary particle diameter is too large, it is difficult to control agglomeration of the particles and a high sintering property is difficult to obtain.

The primary particle diameter of the ITO or indium oxide powder prepared according to the above-mentioned conventional method is generally from several $\mu$m to 0.01 $\mu$m, and the average primary particle diameter satisfies the condition specified in the present invention. Nevertheless, these primary particles of the as-prepared ITO powder are tightly agglomerated and they cannot be used, as they are, as a starting material for the production of the sintered body of the present invention.

The indium oxide powder and ITO powder used in the present invention are characterized in that the primary particle is as fine as mentioned above and the particles are highly dispersed, that is, the particles are not agglomerated.

As the factor for evaluating the dispersibility of a powder, there can be mentioned the surface area measured by the BET method (referred to as "BET surface area") and the particle diameter distribution. The powder used for the production of the sintered body of the present invention has a BET surface area of from 15 m$^2$/g to 50 m$^2$/g, preferably from 20 m$^2$/g to 30 m$^2$/g and a specific surface area of from 2 m$^2$/g to 5 m$^2$/g, preferably from 3.5 m$^2$/g to 5 m$^2$/g, as determined from the particle diameter distribution.

If the BET surface area is too large, the powder becomes porous or the surface state is not good, and the sintering property becomes poor. Accordingly, the BET surface area is preferably not larger than 50 $m^2/g$. If the BET surface area is too small, the sintering property becomes poor.

The ITO or indium oxide powder satisfying the above-mentioned conditions can be prepared by forming an ITO or indium oxide powder having a primary particle diameter not larger than 1 μm and highly dispersing this ITO powder mechanically.

A method comprising mechanically pulverizing a ceramic powder to highly disperse the powder is publicly known as a method for improviing the sintering property of the ceramic powder. However, in the case of indium oxide and ITO powders, it is not true that the sintering property of the powder will be improved by mechanical pulverization.

A ball mill, a sand mill, a homogenizer and a vibrating mill are generally used for mechanically pulverizing indium oxide and ITO powders. As a method for pulverizing (highly dispersing) the powder, capable of obtaining the effects of the present invention sufficiently, there is a method in which the pulverization is carried out by using a pulverizer having a high pulverizing efficiency, such as a vibrating mill. A powder satisfying the conditions specified in the present invention cannot be obtained by using a pulverizer having a low pulverizing efficiency, for example, a rotary ball mill.

Also the pulverization medium used for the pulverization is important, and in view of the pulverizing efficiency, a pulverizing medium having a high specific gravity is preferably used. Incorporation of an impure substance into the powder at this pulverization treatment results in reduction of the electroconductivity of the obtain ITO or indium oxide, sintered body. Therefore, in the present invention, a pulverization medium having a high specific gravity and an excellent abrasion resistance is preferably used. For example, zirconia beads, hard carbon-coated beads, and diamond-coated beads are preferably used as the dispersion medium having a high specific gravity and an excellent abrasion resistance. If hard carbon-coated beads or diamond-coated beads are used, even if a powder formed by abrasion of these beads is incorporated into the oxide powder, carbon as the impure substance is removed as carbon dioxide gas at the ITO powder-sintering temperature, and cause no problems. On the other hand, if alumina beads or glass beads are used, problems occur due to incorporation of impurities. No pulverizing effect can be obtained by resin beads because they are too light in weight. In the present invention, a pulverization medium having a bead diameter of from 5 mm to 1 mm, especially a pulverization medium having a bead diameter of from 2 mm to 1 mm and being capable of fine pulverization, is preferably used.

To improve the pulverizing efficiency and the dispersibility of the powder, a liquid is preferably added to the powder to be pulverized, whereby a slurry is formed. Water and various organic solvents can be used as the liquid to be added to the powder, but in view of the abrasion resistance of the dispersing medium, water is especially preferably used. Addition of a dispersant to the slurry is effective for enhancing the pulverizing efficiency. In view of the pulverizing efficiency, water is preferably added in such an amount that the viscosity of the formed slurry is in the range of from 50 cps to 5,000 cps. If the viscosity of the pulverizing efficiency is outside the above-mentioned range, the pulverizing efficiency is reduced. The amount of water added for forming this slurry is changed according to the properties, such as the particle size of the powder to be treated and the particular pulverization medium used for the pulverization, but water is used in such an amount that the powder/water weight ratio is in the range of from 80/20 to 10/90. Preferably, the pulverization time is about 1 to about 100 hours, especially 5 to 30 hours.

The most important feature in pulverizing using the vibrating pulverizer is that the ratio of the diameter of the pulverizing vessel to the vibration amplitude of the vibrating pulverizer be lower than 10. If a pulverizing vessel having a ratio of 10 or higher is used, the motion of the pulverizing medium within the pulverizing vessel becomes irregular and most of the pulverization medium makes only a small vibrating or sliding movement in the lower portion of the pulverizing vessel. Therefore, the pulverizing efficiency is very low. This phenomenon is especially obvious when the pulverization medium has a small bead size, for example, when a pulverization medium having a bead diameter of about 2 mm is used. If the powder is pulverized in this state, the powder is rendered amorphous. That is, destruction of the crystal, rather than the dispersion of the powder, occurs. Accordingly, this pulverization treatment reduces the sintering property of the powder.

In contrast, when the pulverization treatment is carried out where the ratio of the diameter of the pulverizing vessel to the amplitude of the vibrating pulverizer is lower than 10, the motion of the pulverization medium is very uniform and the agglomeration of the powder is efficiently eliminated. Moreover, the destruction of the crystal by the pulverization is controlled in this pulverization treatment. In addition, in this pulverization treatment, the abrasion of the pulverization medium is controlled and the purity of the treated powder can be maintained at a high level.

By carrying out the pulverization treatment under the above-mentioned conditions, the ITO or indium oxide powder is highly dispersed and an ITO or indium oxide powder satisfying the conditions specified in the present invention can be obtained. Namely, an ITO or indium oxide powder having an average primary particle diameter of from 1 μm to 0.01 μm, a BET surface area of from 15 $m^2/g$ to 50 $m^2/g$ and a specific surface area of from 2 $m^2/g$ to 5 $m^2/g$ as determined from the particle diameter distribution.

Where the powder of the present invention is the ITO powder, the weight ratio of indium oxide to tin oxide is preferably in the range of from 98/2 to 80/20, more preferably from 92/8 to 85/15. If the content of tin oxide is lower than 2% by weight or higher than 20% by weight, a sintered body having a high electroconductivity cannot be obtained by using this powder.

The ITO sintered body of the present invention is formed by molding the starting powder and firing the molded body as in the conventional method for preparing a sintered body. Any molding method can be employed for the molding of the ITO powder. For example, there can be adopted a compression molding method, a casting molding method, an injection molding method or the like. The ITO powder molded body obtained by any of these molding methods has a density of from 3 $g/cm^3$ to 4.5 $g/cm^3$, mostly from 3.5 $g/cm^3$ to 4.5 $g/cm^3$.

The ITO powder molded body is then sintered. The sintering atmosphere is not particularly critical and any atmosphere can be adopted for sintering the molded body. Air, an inert atmosphere, vacuum or the like are usable as the sintering atmosphere. A sintered body obtained by carrying out the sintering in an inert atmosphere or in vacuum has a larger quantity of the oxygen deficiency than in a sintered body obtained by carrying out the sintering in air, and therefore, the specific resistance can be further reduced. But, a sintered body obtained by carrying out the sintering in air is preferable for the preparation of the sintered body used as a sputtering target. In the case of ITO if, the sintering temperature is lower than 1,300° C., the sintered density is not improved and the electroconductivity of the obtained sintered body is poor. Accordingly, the sintering temperature is preferably at least 1,300° C. and more preferably at least 1,350° C. On the other hand, if the sintering temperature exceeds 1,700° C., volatilization of the tin component occurs. Therefore, in the present invention, the sintering temperature is from 1,300° to 1,700° C., preferably from 1,400° to 1,500° C.

The retention time at the sintering temperature is several hours to scores of hours, but a retention time of 5 to 20 hours is ordinarily sufficient. The temperature-elevating rate and temperature-dropping rate are lower than 200° C./hour, preferably lower than 100° C./hour.

In the preparation process of the present invention, since a fine powder is used as the starting material for a sintered body, particles grow during sintering and a high-density sintered body having a density of at least 5.3 g/cm$^3$, mostly a density of at least 6 g/cm$^3$, can be obtained from the above-mentioned molded body having a low density. The sintered body usually has an average grain diameter of from 5 μm to 15 μm.

Since the ITO sintered body of the present invention has a high density and a low specific resistance, the ITO sintered body is useful as a sputtering target for forming a transparent electroconductive film. Since the conventional ITO sintered body is porous and has a low specific resistance, the flexural strength is 5 kg/mm$^2$ at highest. In contrast, the high-density sintered body of the present invention has a flexural strength exceeding 5 kg/cm$^2$, mostly at least 10 kg/mm$^2$, and also has a high thermal conductivity. Therefore, cracking under a thermal shock does not occur or occurs only to a negligible extent. Moreover, since the quantity of voids present in the sintered body is very small, the etching ratio of the target surface by an argon ion, that is the sputtering efficiency, is improved, with the result that the sputtering rate is increased. In the conventional low-density ITO sintered body, the specific resistance is larger than $2 \times 10^{-3}$ Ω-cm. In contrast, in the high-density ITO sintered body of the present invention, the specific resistance is in the range of from $2 \times 10^{-3}$ Ω-cm to $2 \times 10^{-4}$ Ω-cm, mostly from $1 \times 10^{-3}$ Ω-cm to $2 \times 10^{-4}$ Ω-cm. Accordingly, the applicable electric power can be increased over the applicable electric power in conventional techniques, and the discharge characteristics are improved. In addition, in the high-density sintered body of the present invention, little or no selective sputtering of oxygen occurs, and blackening due to reduction of the target surface, which results in reduction of the quality of the transparent electroconductive film, is controlled, and the continuous operation of forming a transparent electroconductive film can be performed very advantageously.

In view of these characteristics, it is expected that an ITO sintered body having a high density and a low specific resistance according to the present invention can be advantageously used as a sputtering target for forming a transparent electroconductive film.

When the ITO powder of the present invention is used as the starting material for a sintered body, pores in the interior of the sintered body are reduced during sintering, and a sintered body having a large sintering contraction, that is, a density of at least 5.3 g/cm$^3$, mostly a density of at least 6 g/cm$^3$, can be formed. In a sintered body obtained from a conventional ITO powder, the advance of the sintering in the portion where agglomeration occurs in secondary particles of the ITO powder is different from that in the portion where such agglomeration does not occur, and therefore, the sintered particles are indeterminate and many voids are formed among the sintered grain. In contrast, in the sintered body formed from the ITO powder of the present invention, since the sintering is uniformly advanced, it is believed that densely filled sintered particles are formed and hence, the density is increased. In ITO obtained by the coprecipitation method, the distribution of tin is especially uniform, and therefore, if the sintered body prepared from this ITO is used as a target, a uniform transparent electroconductive film can be obtained over a broad range.

The present invention will now be described in detail with reference to the following examples that by no means limit the scope of the invention. In the examples, percents are by weight.

EXAMPLE 1

An aqueous solution of acetic acid containing indium and tin at an indium/tin ratio of 90/10 by weight was concentrated to obtain indium/tin mixed acetate, and this mixed acetate was thermally decomposed to form an ITO powder. Water was added to the powder to obtain a slurry having a concentration of 50%, and the slurry was pulverized for 20 hours in a vibrating mill having a vibrating amplitude of 10 mm and a pulverizing vessel diameter of 50 mm by using hard carbon-coated metal beads having a diameter of 2 mm as the pulverization medium. The average primary particle diameter of the powder obtained was 0.3 μm as determined by observation under an electron microscope, the BET surface area was 17 m$^2$/g, and the specific surface area was 3.5 m$^2$/g as determined from the particle diameter distribution.

The powder was compression-molded in a mold to obtain a molded body having a density of 3.7 g/cm$^3$, and the molded body was sintered at 1,400° C. under atmospheric pressure in air. During sintering, the temperature-elevating rate was 100° C./hour, the retention time at 1,400° C. was 10 hours, and the temperature-dropping rate was 100° C./hour. Under these sintering conditions, a sintered body having a sintered density of 5.7 g/cm$^3$, i.e., 80% of the theoretical density, a specific resistance of $3 \times 10^{-4}$ Ω-cm, and an average grain diameter of 7 to 8 μm was obtained.

Figure 1:
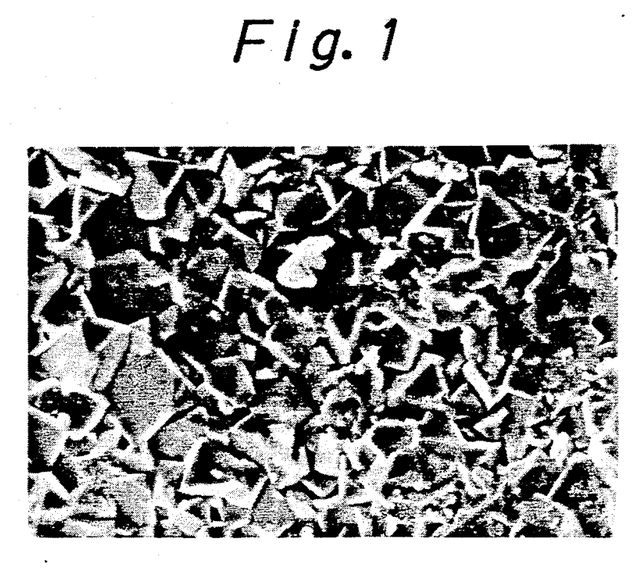
FIG. 1 is a scanning electron microscope photograph (2,000 magnifications) showing the grain structure of the surface of the sintered body obtained in Example 1.

A scanning type electron microscope photograph (2,000 magnifications) of the grain structure of the surface of the obtained sintered body is shown in FIG. 1.

EXAMPLE 2

A film was formed by DC magnetron sputtering by using the sintered body obtained in Example 1. The sputtering conditions were an applied electric power of 4 W/cm$^2$, a pressure of 0.6 Pa (i.e., $5 \times 10^{-3}$ Torr) and a substrate temperature of 350° C. As seen from the results shown in Table 1, a transparent electroconductive film having a very low specific resistance was obtained.

EXAMPLE 3

Indium acetate and tin acetate were independently thermally decomposed to form indium oxide and tin oxide, and these oxides were mixed together so that the indium oxide/tin oxide ratio was 90/10 by weight. Then a powder and a sintered body were prepared from this mixture in the same manner as described in Example 1 except that zirconia beads were used instead of the carbon-coated beads.

In the powder obtained, the average particle diameter was 0.3 μm as determined by observation under an electron microscope, the BET surface area was 16 $m^2/g$, and the specific surface area before the pulverization was 3.5 $m^2/g$ as determined from the particle diameter distribution. The obtained sintered body had a sintered density of 5.9 $g/cm^3$, i.e., 83% of the theoretical density, a specific resistance of $9 \times 10^{-4}$ Ω-cm, and an average grain diameter of 7 to 8 μm.

EXAMPLE 4

A film was prepared by DC magnetron sputtering by using the sintered body obtained in Example 3 under the same sputtering conditions as described in Example 2. The results are shown in Table 1. As seen from Table 1, a transparent electroconductive film having a very low specific resistance was obtained as in Example 2.

EXAMPLE 5

Indium oxide obtained by neutralizing an aqueous solution of nitric acid containing indium and calcining the formed hydroxide and tin oxide obtained by neutralizing an aqueous solution of hydrochloric acid containing tin and calcining the formed hydroxide were used and mixed to obtain a mixed powder having an indium/tin ratio of 90/10 by weight. The powder was pulverized in the same manner as described in Example 1. In the obtained powder, the primary particle diameter was 0.1 μm as determined by observation under an electron microscope, the BET surface area was 20 $m^2/g$, and the specific surface area was 3.3 $m^2/g$ as determined from the particle size distribution.

The powder was molded and sintered in the same manner as described in Example 1 to obtain a sintered body having a sintered density of 6.4 $g/cm^3$, i.e., 90% of the theoretical density, a specific resistance of $3 \times 10^{-4}$ Ω-cm, and an average grain diameter of 7 to 8 μm.

EXAMPLE 6

A film was prepared by DC magnetron sputtering by using the sintered body obtained in Example 5 under the same sputtering conditions as described in Example 2. The results are shown in Table 1. As seen from Table 1, a transparent electroconductive film having a very low specific resistance was obtained as in Example 2.

COMPARATIVE EXAMPLE 1

An aqueous solution of acetic acid containing indium and tin at an indium/tin ratio of 90/10 by weight was concentrated to obtain indium/tin mixed acetate, and an ITO powder was obtained by thermally decomposing the mixed acetate.

The obtained powder had an average primary particle diameter of 0.3 μm as determined by observation under an electron microscope, a BET surface area of 9 $m^2/g$ and a specific surface area of 2 $m^2/g$ as determined from the particle diameter distribution.

Figure 2:
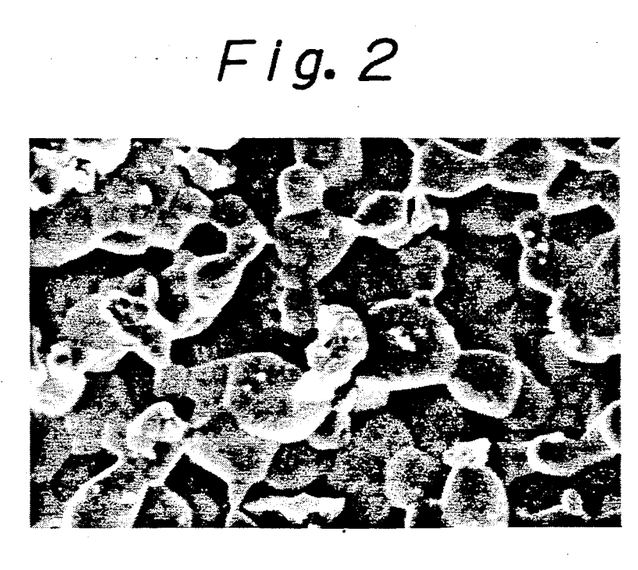
FIG. 2 is a scanning electron microscope photograph (2,000 magnifications) showing the grain structure of the surface of the sintered body obtained in Comparative Example 1.

The powder was molded and sintered under the same conditions as described in Example 1 to obtain a sintered body having a sintered density of 4.7 $m^2/g$, i.e., 66% of the theoretical density, and a specific resistance of $2.4 \times 10^{-4}$ Ω-cm. A scanning electron microscope photo (2,000 magnifications) of the grain structure of the surface of the obtained sintered body is shown in FIG. 2.

Although the starting powder satisfied the conditions of the average primary particle diameter and specific surface area determined from the particle diameter distribution, specified in the present invention, the BET surface area was too small. Namely, agglomerated particle were present. Therefore, the sintering property was bad, and a sintered body having a high sintered density could not be obtained.

COMPARATIVE EXAMPLE 2

Under the same conditions as described in Example 2, a film was prepared by DC magnetron sputtering by using the sintered body obtained in Comparative Example 1. The specific resistance of the formed film is shown in Table 1. As seen from Table 1, a transparent electroconductive film having a low specific resistance as obtained in the examples could not be obtained.

COMPARATIVE EXAMPLE 3

A commercially available indium oxide powder and a commercially available tin oxide powder (reagent) were mixed together so that the indium oxide/tin oxide ratio was 90/10 by weight. The mixture was molded and sintered in the same manner as described in Example 1 to obtain a sintered body having a sintered density of 4.7 $g/cm^3$, i.e., 66% of the theoretical density, and a specific resistance of $2 \times 10^{-3}$ Ω-cm.

The primary particle diameter of the above-mentioned mixed powder was 0.05 μm as determined by observation under an electron microscope, which satisfies the condition specified in the present invention, but the specific surface area determined from the particle diameter distribution was 2 $m^2/g$ and the BET surface area was 8 $m^2/g$, both of which failed to satisfy the conditions specified in the present invention.

COMPARATIVE EXAMPLE 4

Under the same conditions as described in Example 2, a film was prepared by DC magnetron sputtering by using the sintered body obtained in Comparative Example 3. The specific resistance of the formed film is shown in Table 1. As seen from Table 1, a transparent electroconductive film having a low specific resistance as obtained in the examples could not be prepared.

TABLE 1

|  | Specific Resistance ($\times 10^{-4}$ Ω-cm) |
|---|---|
| Example 2 | 2.1 |
| Example 4 | 2.4 |
| Example 6 | 1.8 |
| Comparative Example 2 | 3.5 |
| Comparative Example 4 | 3.5 |

Figure 3A:
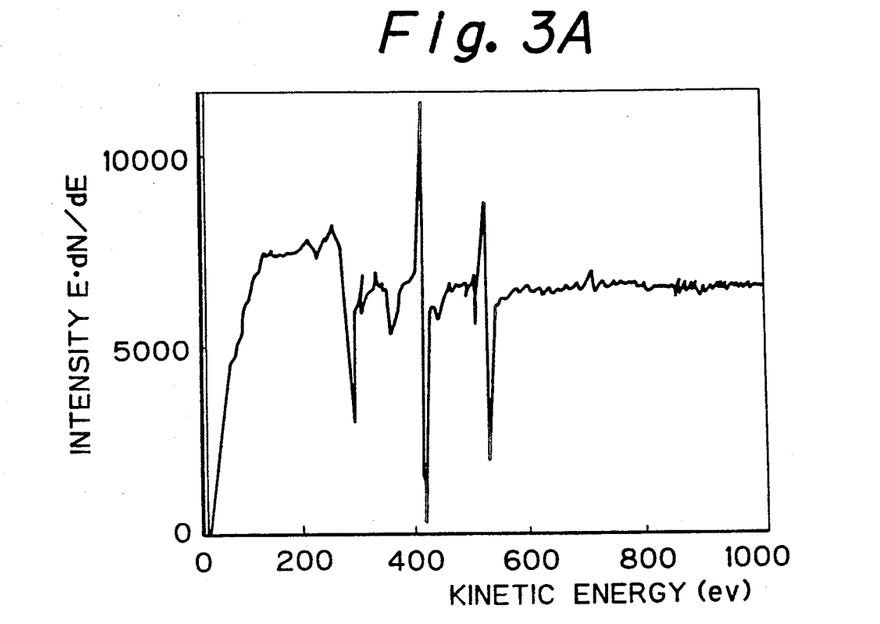
FIGS. 3A, 3B; 4A, 4B; and 5A, 5B show the results of the Auger electron spectroscopic analysis of the sintered bodies used in Examples 2 and 4 and Comparative Example 2 before and after the sputtering, respectively.
Figure 3B:
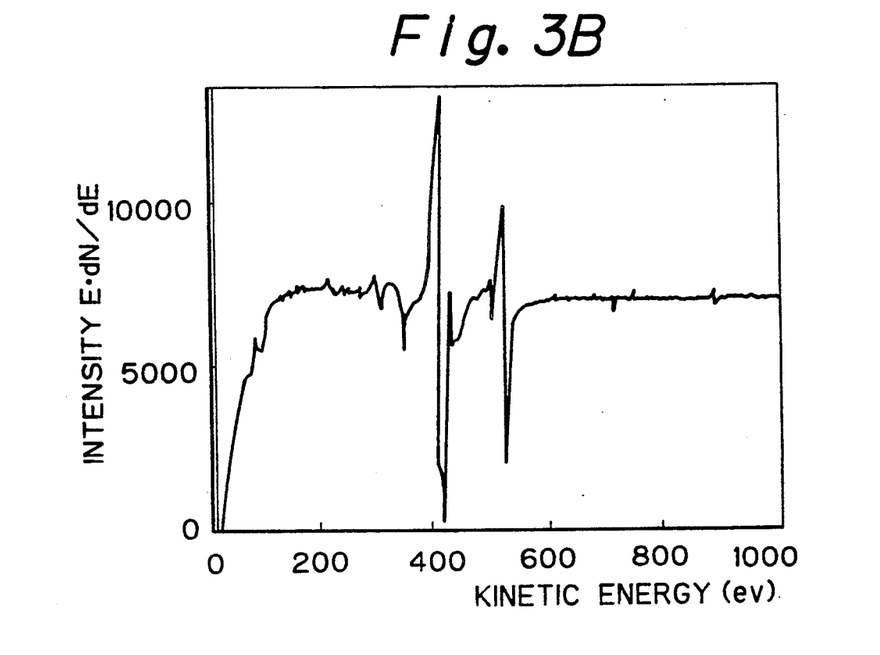
Figure 4A:
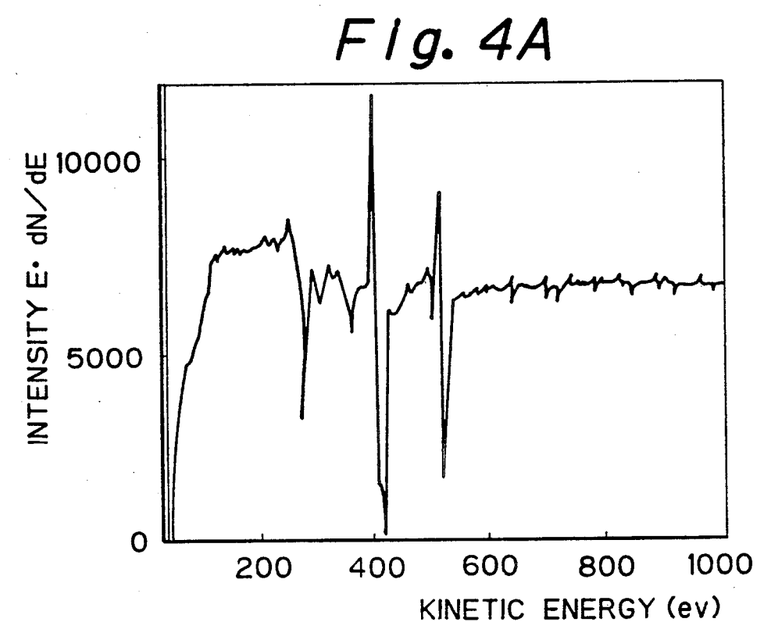
Figure 4B:
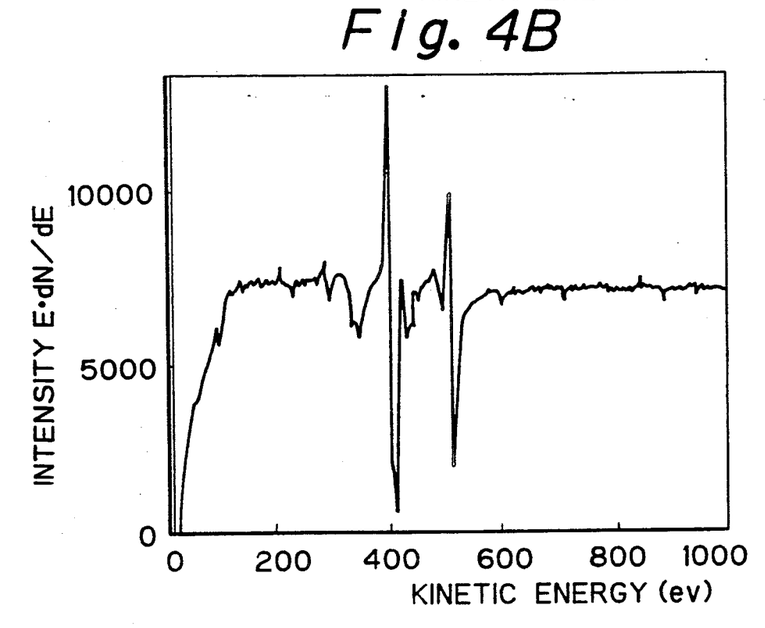
Figure 5A:
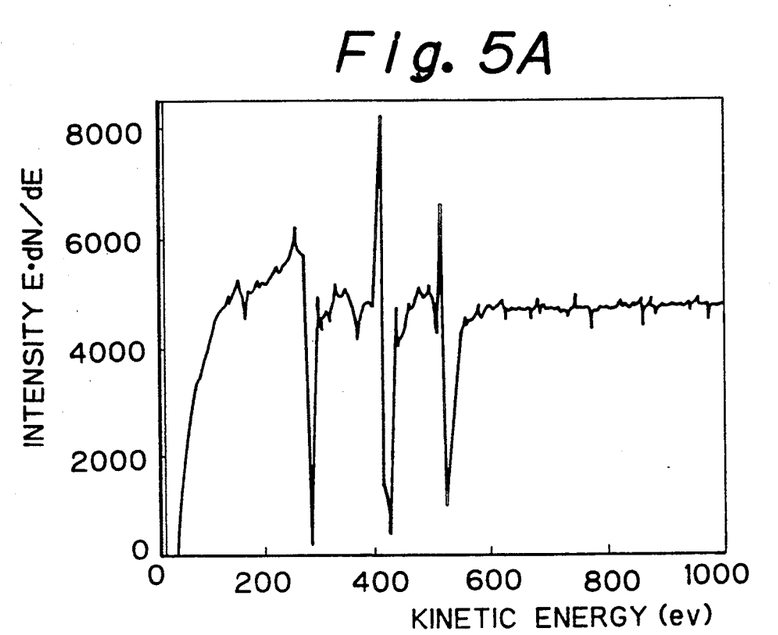
Figure 5B:
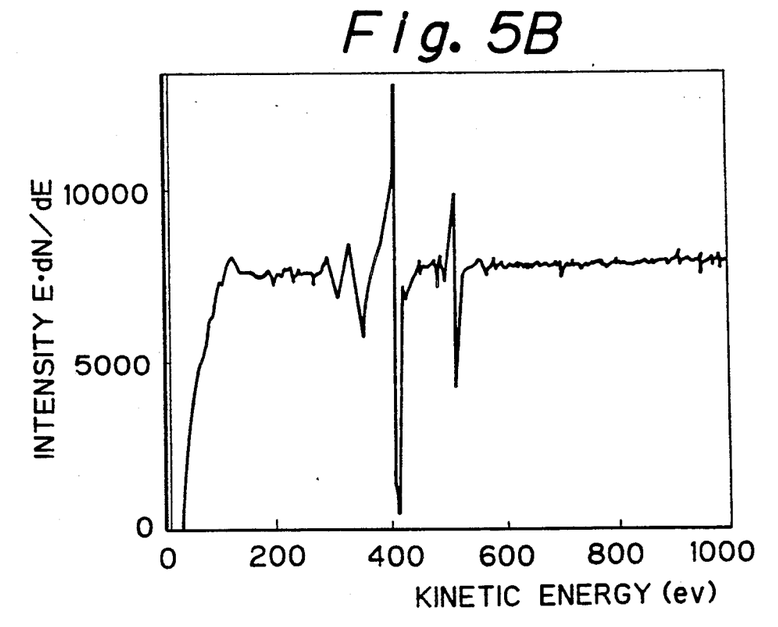

The results of the Auger electron spectroscopic analysis of the surfaces of sputtering targets of the sintered bodies used in Examples 2 and 4 and Comparative Example 2 before and after the sputtering are shown in FIGS. 3, 4 and 5, respectively. FIGS. 3A, 4A and 5A show the data obtained before sputtering and FIGS. 3B, 4B and 5B show the data obtained after sputtering.

Figure 6:
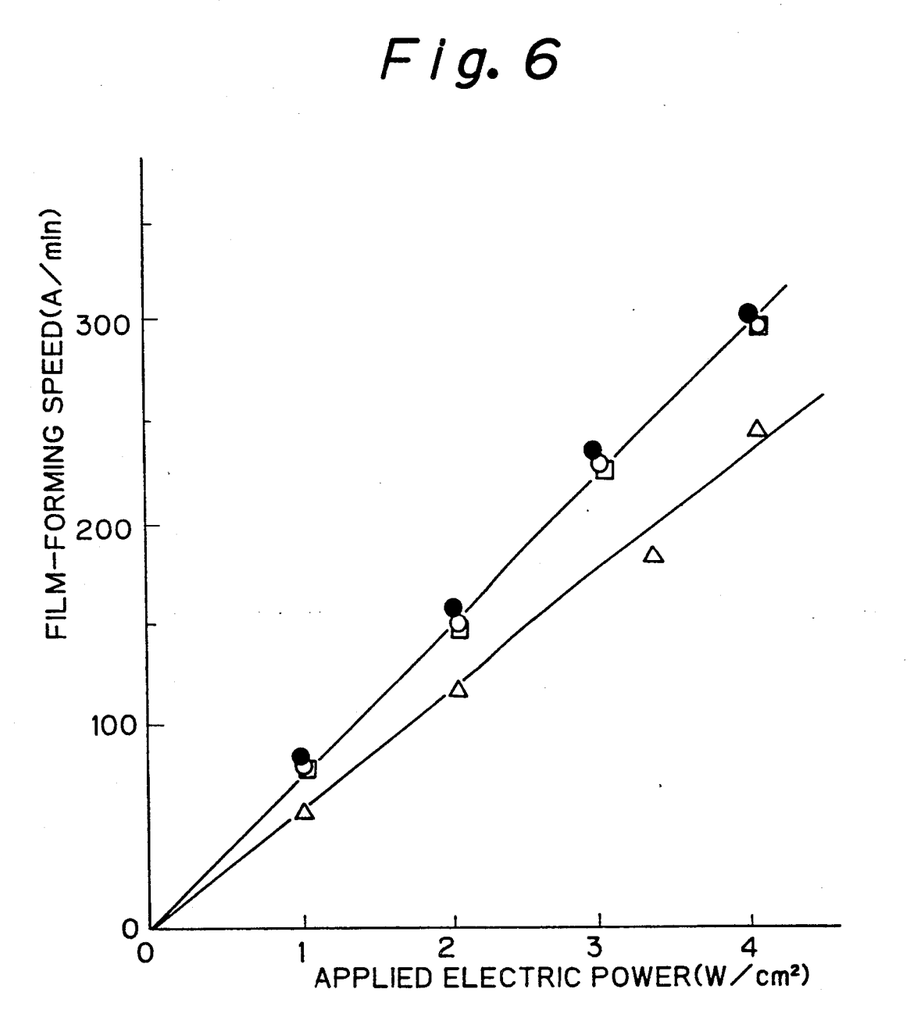
FIG. 6 shows the relationship between the applied electric power and the film-forming speed in the sintered bodies used in Examples 2, 4 and 6 and Comparative Example 2.
Figure 7:
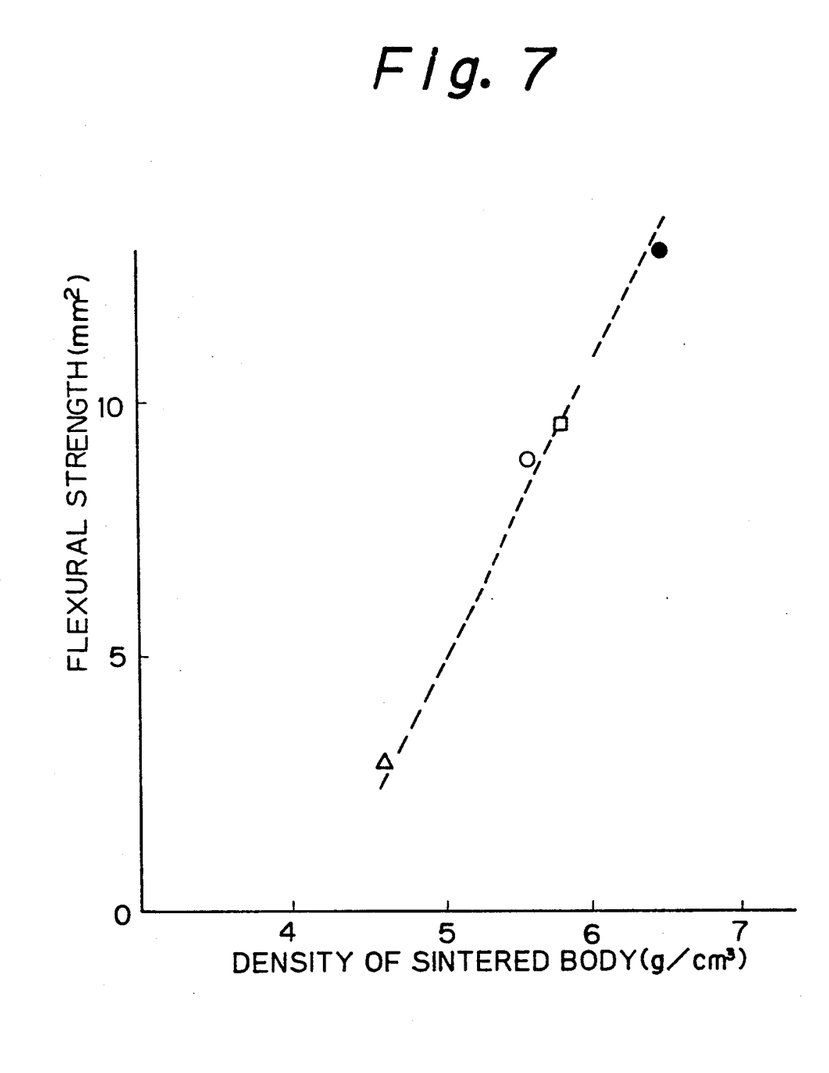
FIG. 7 shows the relationship of the density and the flexural strength in the sintered bodies used in Examples 2, 4 and 6 and Comparative Example 2.
Figure 8:
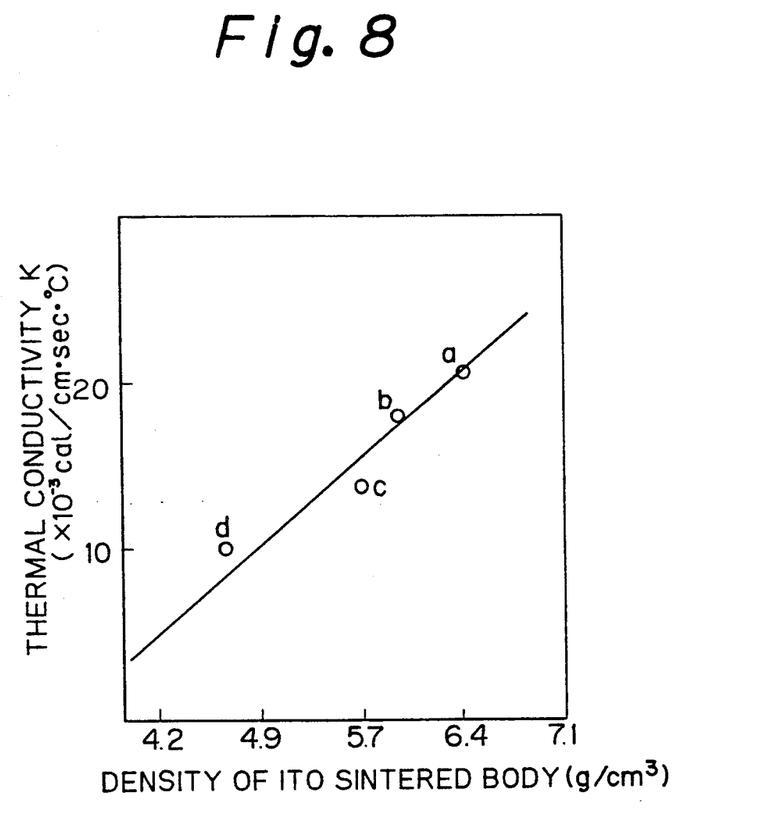
FIG. 8 shows the relationship between the sintered density and the thermal conductivity in the sintered bodies used in Examples 1, 3, and 5 and Comparative Example 3.

Furthermore, by using the targets used in Examples 2, 4 and 6 and Comparative Example 2, films were prepared by changing the applied electric power in the range of from 1 to 4 W/cm$^2$, and the film-forming speed at each applied electric power was determined. The results are shown in FIG. 6. The relationship between the sintered density of the sintered body and the flexural strength is shown in FIG. 7. In FIGS. 4 and 5, mark "o" indicates the results of Example 2, mark "□" indicates the results of Example 4, mark "•" indicates the results of Example 6 and mark "Δ" indicates the results of Comparative Example 2. The relationship between the sintered density of the sintered body of Example 2 and the thermal conductivity thereof is shown in FIG. 8, wherein marks "a", "b", "c", and "d" indicate data obtained in Examples 5, 3, and 1 and Comparative Example 3, respectively.

As seen from FIGS. 3A, 3B, 4A and 4B the reduction of the surface (reduction of oxygen) was not observed in the high-density ITO sintered bodies (Examples 2, 4 and 6). From FIG. 6, it is seen that a film could be formed at a very high speed in the case of the high-density sintered bodies (Examples 2, 4 and 6). From FIG. 7, it is seen that the high-density sintered bodies (Examples 2, 4 and 6) had a high flexural strength and cracking did not occur or occurred only to a minor extent. From FIG. 8, it is seen that the high-density ITO sintered bodies had a high thermal conductivity and little or no cracking under a thermal shock occurred.

We claim:

1. An indium oxide powder or indium oxide/tin oxide powder having an average primary particle diameter of from 1 μm to 0.01 μm, a surface area of from 15 m$^2$/g to 50 m$^2$/g as measured by the BET method, and a specific surface area of from 2 m$^2$/g to 5 m$^2$/g as determined from the particle diameter distribution.

2. The powder according to claim 1, which has an average primary particle diameter of from 0.5 μm to 0.03 μm.

3. The powder according to claim 1, which has a surface area of from 20 to 30 m$^2$/g as measured by the BET method.

4. The powder according to claim 1, which has a specific surface area of from 3.5 m$^2$/g to 5 m$^2$/g as determined from the particle diameter distribution.

5. The powder according to claim 1, which is an indium oxide/tin oxide powder containing 80 to 98% by weight of indium oxide and 20 to 2% by weight of tin oxide.

6. A process for the preparation of an indium oxide powder or an indium oxide/tin oxide powder having an average primary particle diameter of from 1 μm to 0.01 μm, a surface area of from 15 m$^2$/g to 50 m$^2$/g as measured by the BET method, and a specific surface area of from 2 m$^2$/g to 5 m$^2$/g as determined from the particle diameter distribution, which comprises highly dispersing an indium oxide powder or an indium oxide/tin oxide powder having an average primary particle diameter not larger than 1 μm in the pulverizing vessel of a vibrating pulverizer, the ratio of the diameter of the pulverizing vessel to the vibration amplitude of the pulverizer being lower than 10.

7. The process of claim 6, wherein the indium oxide/tin oxide powder to be dispersed is obtained by coprecipitating a salt containing indium and tin from a solution containing indium and tin, and calcining the coprecipitated salt at a temperature of from 300° C. to 800° C.

8. The process of claim 6, wherein the average primary particle diameter is from 0.5 μm to 0.03 μm.

9. The process of claim 6, including a pulverizing medium in the pulverizing vessel composed of beads selected from the group consisting of zirconia beads, hard carbon-coated beads, and diamond-coated beads; said beads having a diameter of from 5 mm to 1 mm.

10. The process of claim 6, wherein the indium oxide powder or indium oxide/tin oxide powder is dispersed in an aqueous slurry wherein the powder to water ratio is from 80/20 to 10/90 by weight.

11. An indium oxide/tin oxide sintered body having a density of at least 5.3 g/cm$^3$, a specific resistance of from $2 \times 10^{-3}$ Ω-cm to $2 \times 10^{-4}$ Ω-cm, and a sintered particle diameter of from 5 μm to 15 μm.

12. The sintered body according to claim 11, wherein the ratio of indium oxide to tin oxide is from 80/20 to 98/2 by weight.

13. The sintered body according to claim 11, which has a density of 6 g/cm$^3$ and a specific resistance of from $1 \times 10^{-3}$ Ω-cm to $2 \times 10^{-4}$ Ω-cm.

14. A process for the preparation of an indium oxide/tin oxide sintered body having a density of at least 5.3 g/cm$^3$, a specific resistance of from $2 \times 10^{-3}$ Ω-cm to $2 \times 10^{-4}$ Ω-cm, and an average grain diameter of from 5 μm to 15 μm, which comprises sintering an indium oxide/tin oxide powder having an average primary particle diameter of from 1 μm to 0.01 μm, a surface area of from 15 m$^2$/g to 50 m$^2$/g as measured by the BET method, and a specific surface area of from 2 m$^2$/g to 5 m$^2$/g as determined from the particle diameter distribution, at a temperature of from 1,300° C. to 1,700° C., said powder being prepared by highly dispersing an indium oxide/tin oxide powder having an average primary particle diameter not larger than 1 μm in the pulverizing vessel of a vibrating pulverizer, the ratio of the diameter of a pulverizing vessel to the vibration amplitude of the pulverizer being lower than 10.

15. The process according to claim 14, wherein the ratio of indium oxide to tin oxide is from 80/20 to 98/2 by weight.

16. The process according to claim 14, wherein the indium oxide/tin oxide powder has an average primary particle diameter of from 0.5 μm to 0.03 μm.

17. The process according to claim 14, wherein the indium oxide/tin oxide powder has a surface area of from 20 m$^2$/g to 30 m$^2$/g as measured by the BET method.

18. The process according to claim 14, wherein the indium oxide/tin oxide powder has a specific surface area of from 3.5 m$^2$/g to 5 m$^2$/g as determined from the particle diameter distribution.

19. The process according to claim 14, wherein the sintering is carried out at a temperature of 1,400° C. to 1,500° C.

20. The process according to claim 19, wherein the indium oxide/tin oxide powder is maintained at the sintering temperature for a period of 5 to 20 hours.

21. The process according to claim 19, wherein the indium oxide/tin oxide powder is heated at a temperature-elevating rate of lower than 200° C./hour to the sintering temperature and the sintered product is cooled at a temperature-dropping rate of lower than 200° C./hour from the sintering temperature.

22. The process according to claim 14, wherein the sintering is carried out in an inert atmosphere or in vacuum, or in air.

23. A sputtering target comprising an indium oxide/tin oxide sintered body having a density of at least 5.3 g/cm$^3$, a specific resistance not larger than $2\times10^{-3}$ $\Omega$-cm to $2\times10^{-4}$ $\Omega$-cm, and an average grain diameter of from 5 $\mu$m to 15 $\mu$m.

24. The sintered body according to claim 23, wherein the ratio of indium oxide to tin oxide is from 80/20 to 98/2 by weight.

25. The sintered body according to claim 23, which has a density of 6 g/cm$^3$ and a specific resistance of from $1\times10^{-3}$ $\Omega$-cm to $2\times10^{-4}$ $\Omega$-cm.

* * * * *

UNITED STATES PATENT AND TRADEMARK OFFICE
CERTIFICATE OF CORRECTION

PATENT NO. : 5,071,800

DATED : December 10, 1991

INVENTOR(S) : Tetsushi Iwamoto et al.

It is certified that error appears in the above-identified patent and that said Letters Patent is hereby corrected as shown below:

Title page, item [54] and col. 1,

IN THE TITLE, line 3, "TARGE" should read --TARGET--.

Claim 11, column 12, lines 17-18, "a sintered particle" should read --an average grain--.

Signed and Sealed this

Twentieth Day of September, 1994

Attest:

BRUCE LEHMAN

Attesting Officer      Commissioner of Patents and Trademarks